United States Patent Office.

GEORGE FREDERICK CORNELIUS, OF WESTMINSTER, GREAT BRITAIN.

Letters Patent No. 106,784, dated August 30, 1870.

IMPROVEMENT IN THE MANUFACTURE OF PAINT AND VARNISH.

The Schedule referred to in these Letters Patent and making part of the same.

I, GEORGE FREDERICK CORNELIUS, of Great Queen street, in the city of Westminster and Kingdom of Great Britain, have invented certain Improvements in the Manufacture of Paint and Varnish, of which the following is a specification.

The improvements consist in the treatment, for the purposes of manufacturing paint and varnish therefrom, of the mineral and vegetable substances formed and found in the residuum or dregs left in the process manufacturing varnish, as ordinarily performed.

The improvements may be performed as follows:

I put in a suitable copper or pot ten hundred weight (cwt.) of the above residuum or dregs, adding thereto five gallons of linseed or other oil; I then boil the mass until the whole of the water is evaporated, taking great care that the boiling is gradual, and the temperature does not exceed 300° Fahrenheit, or the product will be chemically altered in character. After the evaporation is complete, I cause the resultant mass to be continually stirred and gradually raise the temperature from 300° to 400° Fahrenheit. When the latter heat is obtained, I immediately draw the fires, and quickly strain the contents of the copper or pot through fine sieves, and allow them to settle and cool; after which I remove the dark matter found formed on the surface, and heat the dark matter and the residue as follows:

When I wish to make paint, I take the residue lastly described and grind or mix with it sufficient oil to convert it into a proper consistance for pugging and grinding, after which the resultant mass is to be ground very fine, when it is in a fit state to mix with and form the base of any desired color, and, after so mixing, can then be treated with turpentine, oil, and driers, in the usual manner.

When I wish to make varnish, I take the dark or surface matter described above, and add one hundredweight (cwt.) to three hundredweight of linseed or other oils thereto.

This amalgamation I place into a varnish copper or pot, and boil up to 300° or 400° Fahrenheit. I then draw the fires and remove the product (varnish) to vats or cisters, to clarify in the usual way.

What I claim is—

The preparation of paint and varnish of the ingredients, in the proportions, and by the process, substantially as set forth and described in the above specification.

G. F. CORNELIUS.

Witnesses:
R. BOYD, 117 Mount Street,
E. MAYHEW, 67 Strand, W. C.